United States Patent
Sahara (10) Patent No.: US 9,236,937 B2
(45) Date of Patent: Jan. 12, 2016

(54) RADIO BASE STATION AND COMMUNICATION CONTROL METHOD INCLUDING DOWNLINK RADIO RESOURCE ALLOCATION

(75) Inventor: Tooru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 14/235,065

(22) PCT Filed: Jul. 25, 2012

(86) PCT No.: PCT/JP2012/068814
§ 371 (c)(1),
(2), (4) Date: Jan. 26, 2014

(87) PCT Pub. No.: WO2013/015309
PCT Pub. Date: Jan. 31, 2013

(65) Prior Publication Data
US 2014/0177490 A1    Jun. 26, 2014

(30) Foreign Application Priority Data
Jul. 26, 2011    (JP) ................................ 2011-163735

(51) Int. Cl.
| H04L 12/28 | (2006.01) |
| H04B 7/26 | (2006.01) |
| H04L 5/00 | (2006.01) |
| H04J 1/16 | (2006.01) |

(52) U.S. Cl.
CPC ............... *H04B 7/2643* (2013.01); *H04L 5/00* (2013.01)

(58) Field of Classification Search
CPC ............................ H04W 16/28; H04B 7/0617

USPC ................................ 370/252, 329, 430, 442
See application file for complete search history.

(56) References Cited

U.S. PATENT DOCUMENTS

| 2002/0115467 A1* | 8/2002 | Hamabe ........................ 455/522 |
| 2005/0035894 A1* | 2/2005 | Dean et al. .................... 341/155 |
| 2005/0243942 A1* | 11/2005 | Sawai ............................ 375/267 |
| 2006/0281494 A1* | 12/2006 | Wilson et al. .............. 455/562.1 |
| 2008/0192622 A1* | 8/2008 | Scheim et al. ................ 370/210 |
| 2009/0052357 A1* | 2/2009 | Suo et al. ...................... 370/280 |
| 2009/0296649 A1* | 12/2009 | Yagi .............................. 370/329 |
| 2010/0285792 A1* | 11/2010 | Chen .................. H04W 72/005 455/422.1 |
| 2010/0322115 A1* | 12/2010 | Wei et al. ...................... 370/280 |

(Continued)

FOREIGN PATENT DOCUMENTS

| JP | 2010-130177 A | 6/2010 |
| JP | 2011-125027 A | 6/2011 |

OTHER PUBLICATIONS

International Search Report; PCT/JP2012/068814; Sep. 18, 2012.
(Continued)

*Primary Examiner* — John Pezzlo
(74) *Attorney, Agent, or Firm* — Studebaker & Brackett PC (57) ABSTRACT

An eNB 100-1 that performs radio communication by using the adaptive array control in the TD-LTE system: receives SRS utilized in the adaptive array control from a plurality of UEs 200; and performs an assignment for each subject downlink RBG, out of a plurality of downlink RBGs. The eNB assigns the subject downlink RBG to a UE 200 that transmitted a specific SRS that is SRS having the highest match rate in a frequency band with the subject downlink RBG, out of a plurality of SRSs received recently before the subject downlink RBG.

5 Claims, 5 Drawing Sheets

(56) References Cited

U.S. PATENT DOCUMENTS

| | | | |
|---|---|---|---|
| 2011/0199999 A1* | 8/2011 | Nakao et al. | 370/329 |
| 2014/0105165 A1* | 4/2014 | Dinan | H04L 27/2692 370/329 |

OTHER PUBLICATIONS

3GPP TS 36.211 V8.7.0 (May 2009), 3rd Generation Partnership Project; Technical Specification Group Radio Access Network; Evolved Universal Terrestrial Radio Access (E-UTRA); Physical Channels and Modulation (Release 8).

3GPP TS 36.213 V8.7.0 (May 2009); 3rd Generation Partnership Project; Technical Specification Group Radio Access Network; Evolved Universal Terrestrial Radio Access (E-UTRA); Physical layer procedures (Release 8).

* cited by examiner

RADIO BASE STATION AND COMMUNICATION CONTROL METHOD INCLUDING DOWNLINK RADIO RESOURCE ALLOCATION

TECHNICAL FIELD

The present invention relates to a radio base station and a communication control method that perform radio communication by using adaptive array control in a TDD radio communication system.

BACKGROUND ART

In a radio communication system (LTE system) that complies with LTE (Long Term Evolution) with its standards currently being discussed in 3GPP (Third Generation Partnership Project), a radio base station assigns a radio resource in radio communication between the radio base station and a radio terminal (for example, see Non Patent Literature 1).

For example, a radio base station assigns one or a plurality of uplink reference signal resources for transmitting an uplink reference signal (SRS: Sounding Reference Signal) and one or a plurality of downlink radio resources for transmitting downlink data, to a radio terminal (see Non Patent Literatures 1 and 2, for example).

Further, in an LTE system according to a Time Division Duplex (TDD) scheme (hereinafter, referred to as "TD-LTE system"), in order to increase a frequency utilization efficiency and improve quality of radio communication, it is considered that adaptive array control using an array antenna is introduced to the radio base station.

The adaptive array control includes a beamforming in which the peak of a directivity pattern of the array antenna is oriented to a radio terminal subordinate to the radio base station and a null steering in which the null of the directivity pattern of the array antenna is oriented to a radio terminal subordinate to another radio base station.

CITATION LIST

Non Patent Literature

Non Patent Literature 1: 3GPP TS 36.211 V8.7.0 "Physical Channels and Modulation", MAY 2009
Non Patent Literature 2: 3GPP TS 36.213 V8.7.0 "Physical Layer Procedures", MAY 2009

SUMMARY OF THE INVENTION

In the TD-LTE system, it is supposed to realize the adaptive array control according to the following procedure.

The radio base station assigns the uplink reference signal resource and the downlink radio resource of the same frequency band as the uplink reference signal resource. Then, on the basis of the uplink reference signal received from the radio terminal, an antenna weight is calculated so that the peak of a directivity pattern is oriented to the radio terminal, whereby the beamforming is performed.

On the other hand, another radio base station performs a null steering by calculating, on the basis of the uplink reference signal received from the radio terminal, an antenna weight so that the null of a directivity pattern is oriented to the radio terminal.

In this way, the uplink reference signal resource and the downlink radio resource are assigned symmetrically for each radio terminal, and therefore, the adaptive array control in the TD-LTE system is realized.

However, a bandwidth of one uplink reference signal resource and a bandwidth of one downlink radio resource may differ. In particular, one uplink reference signal resource is configured by four resource blocks (see Non Patent Literature 1). On the other hand, in a downlink assignment type 0, one downlink radio resource is configured by three resource blocks (see Non Patent Literature 2).

Thus, it is difficult to make identical the frequency bands of the uplink reference signal resource and the downlink radio resource, respectively, and because of this reason, when the symmetry between the uplink reference signal resource and the downlink radio resource is collapsed, the adaptive array control cannot be favorably functioned.

Therefore, an object of the present invention is to provide a radio base station and a communication control method, with which it is possible to enable adaptive array control to be favorably functioned even when bandwidths of an uplink reference signal resource and a downlink radio resource differ respectively in a TDD radio communication system.

To solve the above-described problems, the present invention includes the following features.

The feature of a radio base station according to the present invention is summarized as follows. A radio base station (eNB 100-1) that performs radio communication by using adaptive array control, in a TDD radio communication system (TD-LTE system 10), comprises: a reception unit (radio reception unit 110) that receives an uplink reference signal (uplink SRS) utilized in the adaptive array control from a plurality of radio terminals; and a resource assignment unit (control unit 140) that performs an assignment for each subject downlink radio resource, of the plurality of downlink radio resources (downlink RGB), wherein the resource assignment unit assigns the subject downlink radio resource to a radio terminal that has transmitted a specific uplink reference signal that is an uplink reference signal having a highest match rate in frequency band with the subject downlink radio resource, of a plurality of uplink reference signals received recently before the subject downlink radio resource.

According to such a feature, even when bandwidths of one uplink reference signal resource and one downlink radio resource respectively differ, it is possible to maintain the symmetry between the uplink reference signal resource and the downlink radio resource, and thus, it is possible to enable the adaptive array control to be favorably functioned.

Another feature of the radio base station according to the present invention is summarized as follows. In the aforementioned feature, the radio base station further comprises: a weight calculation unit (weight calculation unit 120) that calculates an antenna weight on the basis of the specific uplink reference signal; and a weight multiplication unit (weight multiplication unit 125) that applies the antenna weight to the subject downlink radio resource, wherein the weight multiplication unit applies the antenna weight calculated on the basis of the specific uplink reference signal to a first portion of the subject downlink radio resource, the first portion overlapping in frequency band with the specific uplink reference signal, and copies the antenna weight applied to the first portion and applies the copied antenna weight to a second portion of the subject downlink radio resource, the second portion not overlapping in frequency band with the specific uplink reference signal.

Another feature of the radio base station according to the present invention is summarized as follows. In the aforementioned feature, a bandwidth of the downlink radio resource differs from a bandwidth of the uplink reference signal.

Another feature of the radio base station according to the present invention is summarized as follows. In the aforementioned feature, the downlink radio resource includes the predetermined number (three) of resource blocks, the uplink reference signal includes resource blocks in the number (four) different from the predetermined number, and the specific uplink reference signal is an uplink reference signal having the largest number of resource blocks that overlap the resource block included in the subject downlink radio resource, of the plurality of uplink reference signals received recently before the subject downlink radio resource.

The feature of a communication control method according to the present invention is summarized as follows. A communication control method in a radio base station that performs radio communication by using adaptive array control in a TDD radio communication system, comprises: a step of receiving an uplink reference signal utilized in the adaptive array control from a plurality of radio terminals; and a resource assignment step of performing an assignment for each subject downlink radio resource, of the plurality of downlink radio resources, wherein in the resource assignment step, the radio base station assigns the subject downlink radio resource to a radio terminal that has transmitted a specific uplink reference signal that is an uplink reference signal having a highest match rate in frequency band with the subject downlink radio resource, of a plurality of uplink reference signals received recently before the subject downlink radio resource.

DESCRIPTION OF THE EMBODIMENT

With reference to the drawings, an embodiment of the present invention will be described. In the drawings of the following embodiment, the same or similar reference signs are applied to the same or similar portions.

(Configuration of Radio Communication System)

Figure 1:
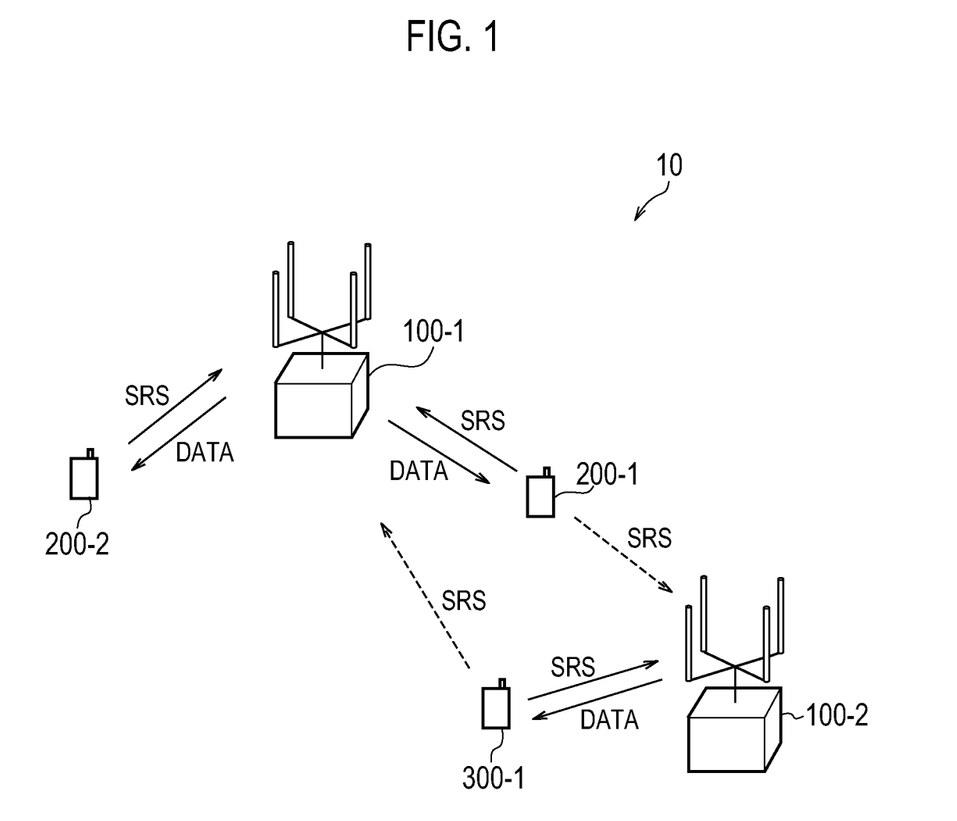
FIG. 1 is a configuration diagram of a TD-LTE system according to an embodiment of the present invention.

FIG. 1 is a configuration diagram of a TD-LTE system 10 according to the present embodiment. In the TD-LTE system 10, a TDD scheme is adopted as a duplex scheme. Further, in the TD-LTE system 10, OFDMA (Orthogonal Frequency Division Multiplexing Access) is adopted in Downlink (DL) radio communication and SC-FDMA (Single Carrier Frequency Division Multiple Access) is adopted in Uplink (UL) radio communication.

As shown in FIG. 1, the TD-LTE system 10 according to the present embodiment includes: a radio base station (eNB: evolved NodeB) 100-1; eNB 100-2 provided adjacently to the eNB 100-1; a radio terminal (UE: User Equipment) 200-1 subordinate to the eNB 100-1; UE 200-2 subordinate to the eNB 100-1; and UE 300-1 subordinate to the eNB 100-2.

It is noted that two UEs 200 subordinate to the eNB 100-1 are shown; however, in reality, more UEs 200 (UE 200-3, UE 200-4, . . . ) are subordinate to the eNB 100-1. Further, one UE 300-1 subordinate to the eNB 100-2 is shown; however, in reality, more UEs 300 (UE 300-2, UE 300-3, . . . ) are subordinate to the eNB 100-2.

Each UE 200 uses a cell formed by the eNB 100-1 as a serving cell, and a radio resource is assigned by the eNB 100-1. Each UE 300 uses a cell formed by the eNB 100-2 as a serving cell, and a radio resource is assigned by the eNB 100-2. It is noted that the radio resource is assigned so that a resource block (RB) including 12 successive subcarriers is one unit.

Each UE 200 and each UE 300 transmit a sounding reference signal (SRS) in a predetermined cycle. The SRS is a known signal sequence for measuring uplink channel quality. In transmitting the SRS, a frequency hopping scheme is applied. That is, a transmission frequency band of the SRS is switched for each transmission cycle of the SRS. In the present embodiment, the SRS corresponds to an uplink reference signal.

In the TD-LTE system 10, adaptive array control using an array antenna is introduced to each eNB 100.

The eNB 100-1 calculates an antenna weight on the basis of the SRS received from each UE 200 subordinate to the eNB 100-1 thereby to perform beamforming in which the peak of the directivity pattern of the array antenna is oriented to each UE 200. Further, the eNB 100-1 calculates the antenna weight on the basis of the SRS received from each UE 300 subordinate to the eNB 100-2 thereby to perform the null steering in which the null of the directivity pattern of the array antenna is oriented to each UE 300.

Similarly, the eNB 100-2 calculates the antenna weight on the basis of the SRS received from each UE 300 subordinate to the eNB 100-2, thereby performing the beamforming in which the peak of the directivity pattern of the array antenna is oriented to each UE 300. Further, the eNB 100-2 calculates the antenna weight on the basis of the SRS received from each UE 200 subordinate to the eNB 100-1, thereby performing the null steering in which the null of the directivity pattern of the array antenna is oriented to each UE 200.

(Configuration of Radio Base Station)

Figure 2:
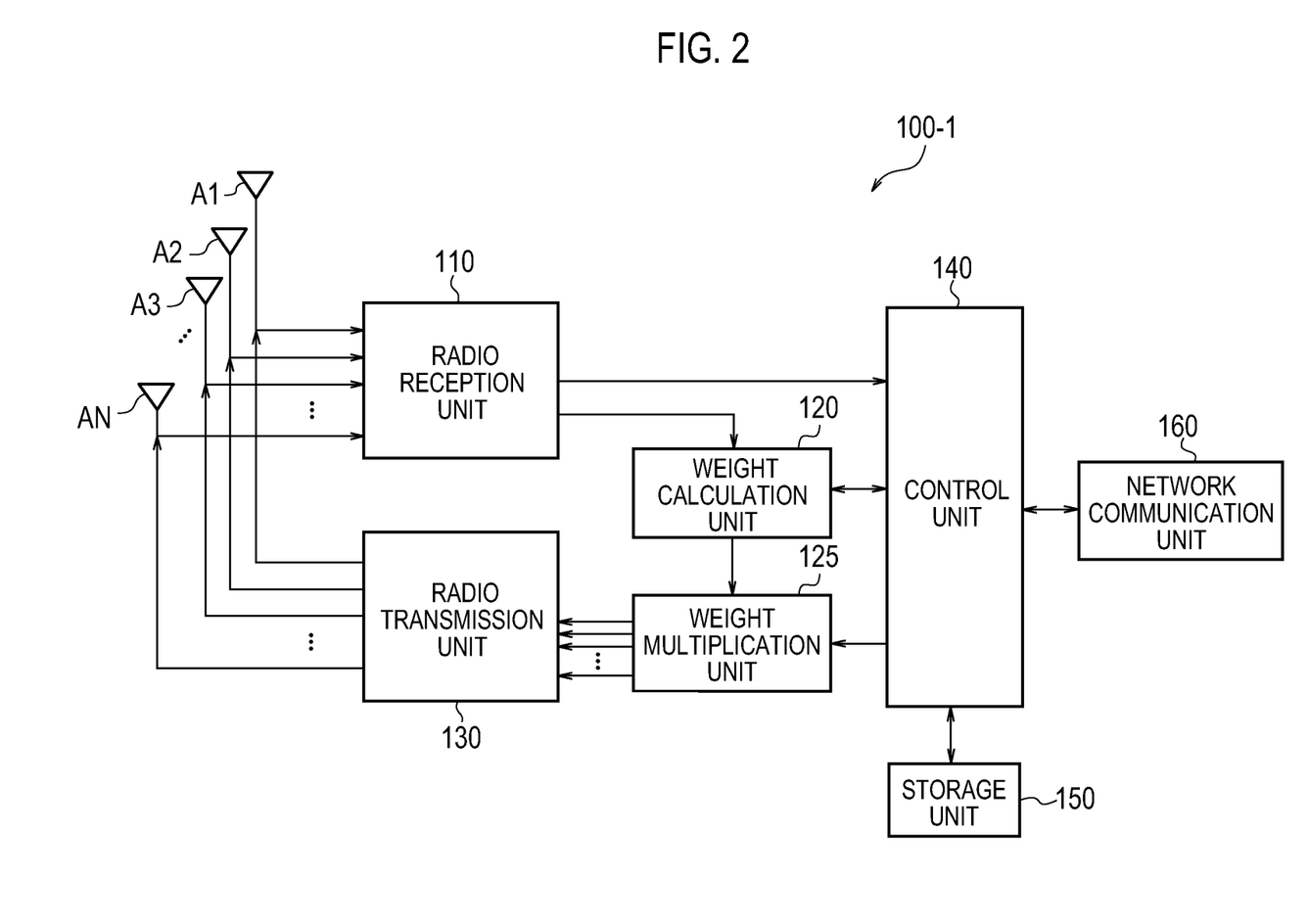
FIG. 2 is a block diagram of the eNB according to an embodiment of the present invention.

FIG. 2 is a block diagram of the eNB 100-1 according to the present embodiment. The eNB 100-2 is configured similarly to the eNB 100-1, and thus, the configuration of the eNB 100-1 is described as a representative of each eNB 100.

As shown in FIG. 2, the eNB 100-1 includes a plurality of antenna elements Al to AN, a radio reception unit 110, a weight calculation unit 120, a weight multiplication unit 125, a radio transmission unit 130, a control unit 140, a storage unit 150, and a network communication unit 160.

The plurality of antenna elements Al to AN configure an array antenna, and are used for transmitting and receiving a radio signal.

The radio reception unit 110 receives a reception signal including uplink data and the SRS, for each of the plurality of antenna elements Al to AN. The radio reception unit 110 outputs the SRS included in the reception signal to the weight calculation unit 120 and the control unit 140, and outputs the reception signal to the control unit 140. It is noted that the radio reception unit 110 amplifies the reception signal, converts (down-converts) the reception signal from a radio frequency (RF) band to a baseband (BB) band, for example. The radio reception unit 110 in the present embodiment corresponds to a reception unit that receives the SRS utilized in the adaptive array control from a plurality of UEs 200.

The control unit 140 decides the assignment of a downlink RB group (RBG) on the basis of the SRS received by the radio reception unit 110. The downlink RBG is configured by three RBs continuous on a frequency axis. On the other hand, the uplink SRS resource used for transmitting the SRS is configured by four RBs continuous on the frequency axis. Thus, the bandwidth of the downlink RBG and the bandwidth of the uplink SRS resource differ.

The control unit 140 in the present embodiment corresponds to a resource assignment unit that performs assignment for each subject downlink RBG, out of a plurality of downlink RBGs. The control unit 140 assigns a subject downlink RBG to UE 200 that transmitted a specific SRS that is an uplink SRS having the highest match rate in a frequency band with the subject downlink RBG, out of a plurality of SRSs received recently before the subject downlink RBG. Then, the control unit 140 notifies the weight calculation unit 120 and the weight multiplication unit 125, of assignment information of the downlink RBG.

The weight calculation unit 120 receives the SRS from the radio reception unit 110, and receives the assignment information of the downlink RBG from the control unit 140. The weight calculation unit 120 calculates an antenna weight, for each RB, for orienting the peak toward the UE 200 subordinate to the eNB 100-1 and orienting the null toward the UE subordinate to another eNB, on the basis of the SRS from the UE 200 subordinate to the eNB 100-1 and the SRS from the UE subordinate to the other eNB.

In particular, the weight calculation unit 120 calculates the antenna weight of the RB (first portion) that overlaps, in frequency band, with the specific SRS corresponding to the subject downlink RBG, when the antenna weight is calculated for each RB included in the subject downlink RBG. Then, the weight calculation unit 120 outputs the antenna weight for each RB to the weight multiplication unit 125.

The weight multiplication unit 125 receives the transmission signal including the downlink data from the control unit 140 and receives the antenna weight from the weight calculation unit 120. The weight multiplication unit 125 distributes the transmission signal to each of the plurality of antenna elements Al to AN and performs a weighting process in which each transmission signal is multiplied by the antenna weight. Then, the weight multiplication unit 125 outputs the weighted transmission signal to the radio transmission unit 130.

In the weighting process, the weight multiplication unit 125 applies the antenna weight calculated on the basis of the specific SRS, to the first portion that overlaps, in frequency band, with the specific SRS corresponding to the subject downlink RBG, of the subject downlink RBG. On the other hand, the weight multiplication unit 125 copies the antenna weight applied to the first portion, and applies the copied antenna weight to RB (second portion) that does not overlap in frequency band with the specific SRS, of the subject downlink RBG.

The radio transmission unit 130 receives the weighted transmission signal from the weight multiplication unit 125. The radio transmission unit 130 outputs the weighted transmission signal to the plurality of antenna elements Al to AN. It is noted that the radio transmission unit 130 amplifies the transmission signal, and converts (up-converts) the transmission signal from the BB band to the RF band, for example.

The control unit 140 controls various functions of the eNB 100-1. The control unit 140 assigns the radio resource to each UE 200 subordinate to the eNB 100-1. In particular, the control unit 140 assigns an uplink SRS resource for transmitting SRS; a PUCCH (Physical Uplink Control Channel) resource for transmitting uplink control data; a PUSCH (Physical Uplink Shared Channel) resource for transmitting uplink user data; a PDCCH (Physical Downlink Control Channel) resource for transmitting downlink control data; and a PDSCH (Physical Downlink Shared Channel) resource for transmitting downlink user data, to each UE 200. The PDSCH resource is configured by one or a plurality of downlink RBGs.

The control unit 140 assigns the PUCCH resource, the PUSCH resource, the PDCCH resource, and the PDSCH resource, for each subframe, and controls so that the assignment information is notified to the UE 200 for each subframe. On the other hand, a specification does not allow an assignment of the uplink SRS resource to be changed for each subframe. Thus, the control unit 140 notifies the UE 200 of an assignment parameter by signaling of an upper layer, only when it becomes necessary to set or change the assignment. The assignment parameter of the uplink SRS resource includes an SRS bandwidth, an SRS transmission cycle, a hopping start frequency band, an SRS transmission available frequency band, etc.

As a scheduling algorithm for defining a priority for assigning the uplink SRS resource, a PF (Proportional Fairness) scheme is used, for example. In the PF scheme, a ratio of an instantaneous throughput to an average throughput is calculated for each UE 200, and the priority of the assignment is set the higher as the ratio of the instantaneous throughput to the average throughput is higher.

The storage unit 150 stores various types of information to be used for the control by the control unit 140.

The network communication unit 160 communicates with a core network (EPC: Evolved Packet Core) or with a neighboring eNB.

(Operation of Radio Base Station)

Next, by using FIG. 3 to FIG. 6, an operation of the eNB 100-1 according to the present embodiment will be described. Hereinafter, an operation in which the eNB 100-1 assigns a resource to each UE 200 subordinate to the eNB 100-1 will be described. It is noted that the eNB 100-2 assigns a resource to each of the subordinate UEs 300 in much the same way as the eNB 100-1.

Figure 3:
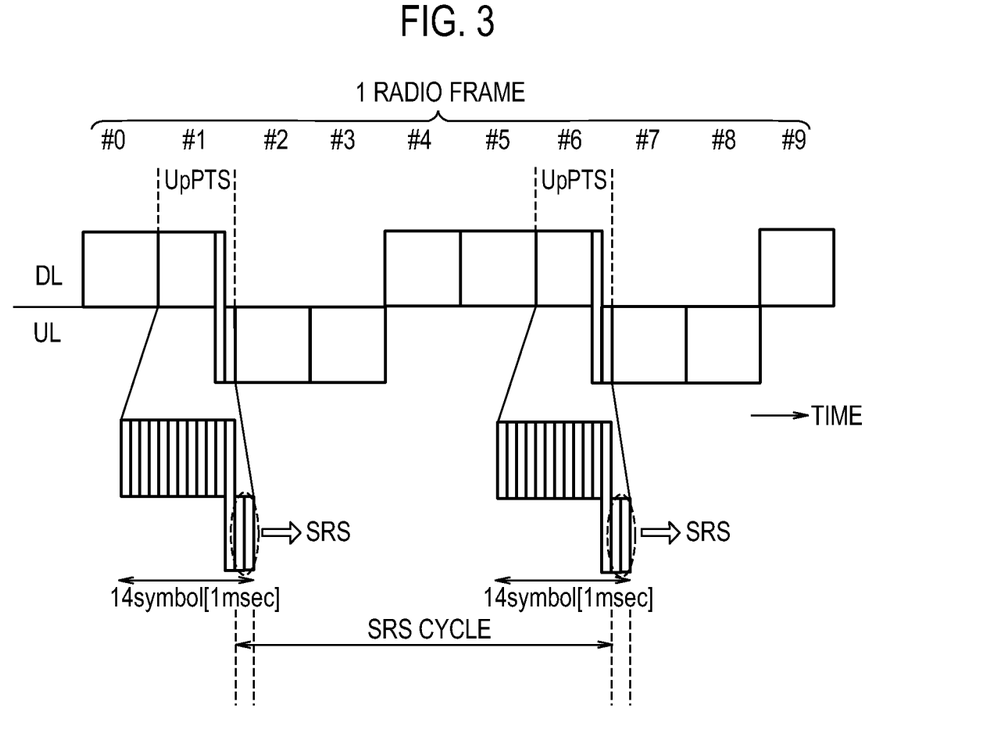
FIG. 3 is a configuration diagram of the radio frame used in the TD-LTE system according to an embodiment of the present invention.

(1) Configuration of Radio Frame Firstly, by using FIG. 3, the configuration of a radio frame used in the TD-LTE system 10 will be described. FIG. 3 is a configuration diagram of the radio frame used in the TD-LTE system 10 according to the present embodiment. It is noted that in a specification, there are seven patterns defined for the configuration of a radio frame of a TDD scheme (that is, a configuration pattern of a subframe); one of these patterns will be described, as an example, in this case.

As shown in FIG. 3, one radio frame is configured by 10 subframes on a time axis. Each subframe is configured by 14 symbols on a time axis. Each subframe has a time length of 1 msec. Further, each subframe is configured by about 50 RBs on a frequency axis.

A subframe #0, a subframe #4, a subframe #5, and a subframe #9 are downlink-dedicated subframes, respectively. In the downlink-dedicated subframe, a head portion is a control region used, on a time axis, as the PDCCH resource, and the remaining portion is a data region used as the PDSCH resource.

A subframe #2, a subframe #3, a subframe #7, and a subframe #8 are uplink-dedicated subframes, respectively. In the uplink-dedicated subframe, both ends are a control region used, on a frequency axis, as the PUCCH resource, and the remaining portion (central portion) is a data region used as the PUSCH resource.

A subframe #1 and a subframe #6 are special subframes for switching an uplink and a downlink, respectively. Each of the special subframes includes a downlink pilot time slot (DwPTS), a guard period (GP), and an uplink pilot time slot (UpPTS). It is noted that in a specification, there are a plurality of patterns defined for the configuration of the special subframe (that is, a symbol number of the DwPTS, the GP, and the UpPTS in the special subframe); one of these patterns will be described, as an example, in the present embodiment. For example, the DwPTS occupies a first symbol to an 11th symbol, the GP occupies a 12th symbol, and the UpPTS occupies 13th and 14th symbols.

In the present embodiment, the UpPTS is used for transmitting the SRS. The eNB 100-1 assigns each uplink SRS resource included in the UpPTS, to each of the subordinate UEs 200.

Figure 4:
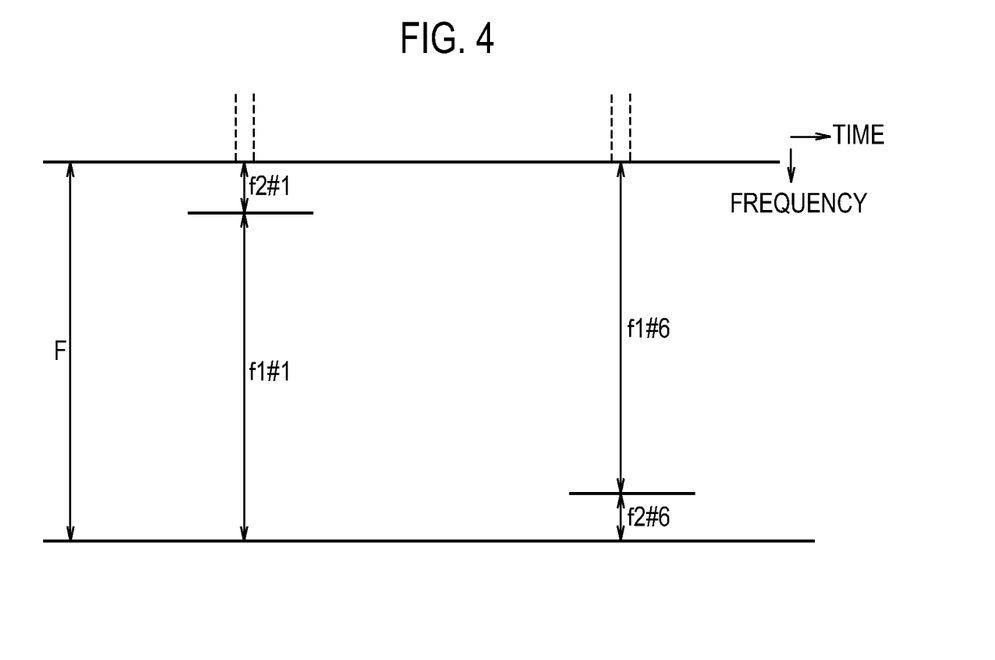
FIG. 4 is a diagram for describing an SRS transmission available frequency band set in the special subframe by the eNB according to an embodiment of the present invention.

FIG. 4 is a diagram for describing an SRS transmission available frequency band set in the special subframe, by the eNB 100-1.

As shown in FIG. 4, in the UpPTS of the special subframe #1, the eNB 100-1 sets most of a system frequency band (carrier frequency band) F that can be used for radio communication as an SRS transmission available frequency band f1#1. On the other hand, the eNB 100-1 sets the remaining portion (low frequency portion) of the system frequency band F as an SRS transmission unavailable frequency band f2#1.

In the UpPTS of the special subframe #6, the eNB 100-1 sets most of a system frequency band F as an SRS transmission available frequency band f1#6. On the other hand, the eNB 100-1 sets the remaining portion of the system frequency band F (high frequency portion) as an SRS transmission unavailable frequency band f2#6.

It is noted that hereinafter, the UpPTS of the special subframe is referred to as "SRS timing", where appropriate.

(2) Downlink RBG Assignment Operation and Antenna Weight Calculation Operation

Figure 5:
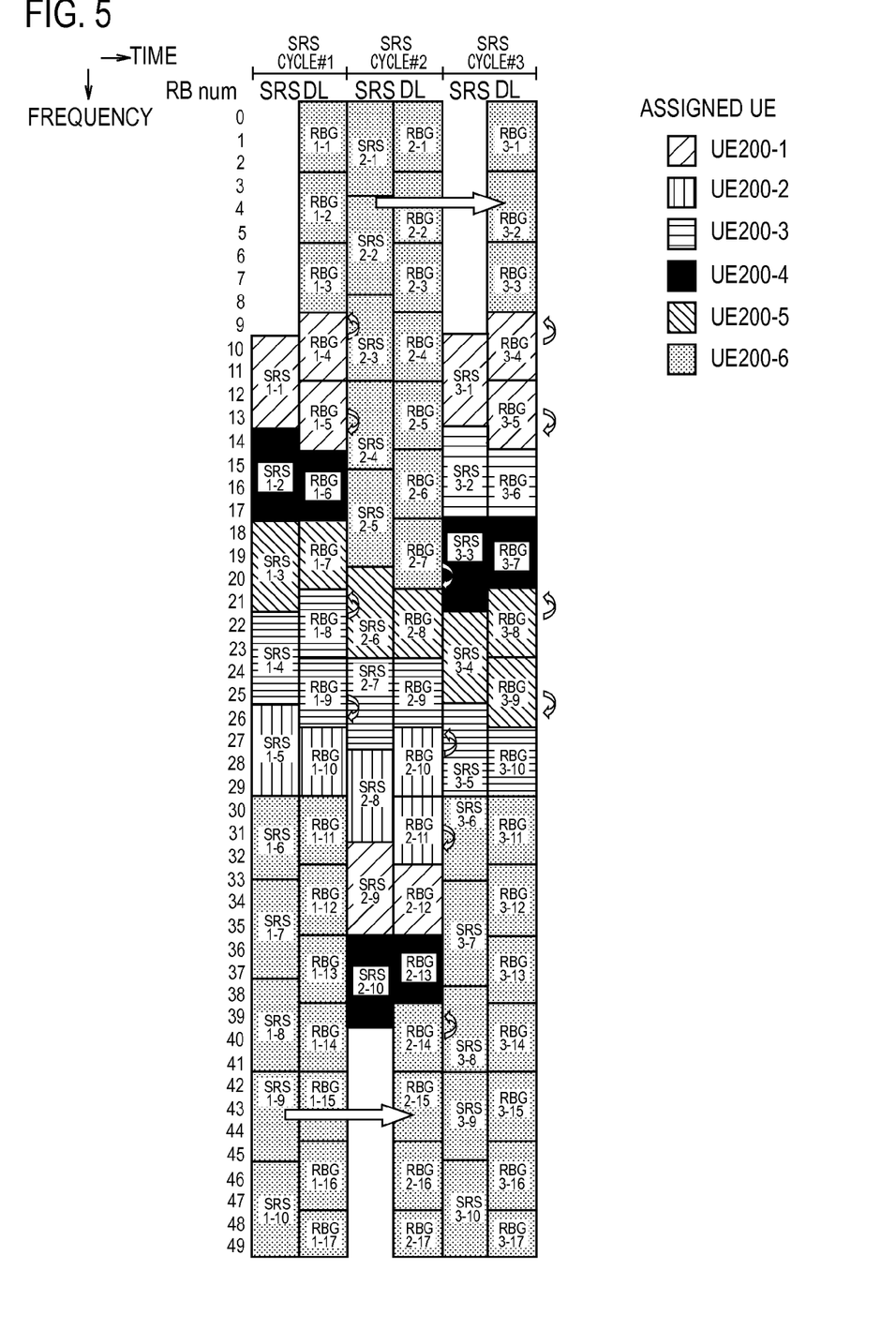
FIG. 5 is a diagram for describing the downlink RBG assignment operation and the antenna weight calculation operation according to an embodiment of the present invention.

Next, by using FIG. 5, a downlink RBG assignment operation and an antenna weight calculation operation will be described. FIG. 5 is a diagram for describing the downlink RBG assignment operation and the antenna weight calculation operation. In FIG. 5, the system frequency band F is configured by 50 RBs, and an assignment state of three SRS cycles, i.e., SRS cycles #1 to #3 is shown. In each SRS timing of the SRS cycles #1 and #3, a low frequency portion (RB #0 to RB #9) is set as the SRS transmission unavailable frequency band, and in the SRS timing of the SRS cycle #2, a high frequency portion (RB #40 to RB #49) is set as the SRS transmission unavailable frequency band.

As shown in FIG. 5, in the SRS timing of the SRS cycle #1, an uplink SRS resource #1-1 including RB #10 to RB #13 is assigned to the UE 200-1. An uplink SRS resource #1-2 including RB #14 to RB #17 is assigned to the UE 200-4. An uplink SRS resource #1-3 including RB #18 to RB #21 is assigned to the UE 200-5. An uplink SRS resource #1-4 including RB #22 to RB #25 is assigned to the UE 200-3. An uplink SRS resource #1-5 including RB #26 to RB #29 is assigned to the UE 200-2. An uplink SRS resource #1-6 including RB #30 to RB #33, an uplink SRS resource #1-7 including RB #34 to RB #37, an uplink SRS resource #1-8 including RB #38 to RB #41, an uplink SRS resource #1-9 including RB #42 to RB #45, and an uplink SRS resource #1-10 including RB #46 to RB #49, are assigned to the UE 200-6. The eNB 100-1 receives the SRS transmitted from the UE 200 by using each uplink SRS resource #1.

In such an SRS assignment status, the eNB 100-1 assigns, for each UE 200, the subject downlink RBG to UE 200 that transmitted a specific SRS that is SRS having the highest match rate in a frequency band with the subject downlink RBG, out of a plurality of SRSs received recently before the subject downlink RBG. The specific SRS is an uplink SRS having the largest number of RBs that overlap the RB included in the subject downlink RBG, out of a plurality of SRSs received recently before the subject downlink RBG.

In this case, a description will be given of an operation of a case where in the DL of the SRS cycle #1, a downlink RBG #1-5 including RB #12 to RB #14 is the subject downlink RBG. A frequency band of the downlink RBG #1-5 partially overlaps a frequency band (RB #10 to RB #13) of an uplink SRS resource #1-1 in the SRS timing of the SRS cycle #1, and partially overlaps a frequency band (RB #14 to RB #17) of an uplink SRS resource #1-2.

In this case, the control unit 140 of the eNB 100-1 detects (counts) that the number of RBs that overlap in the downlink RBG #1-5 and the uplink SRS resource #1-1 is "2", and the number of RBs that overlap in the downlink RBG #1-5 and the uplink SRS resource #1-2 is "1", and determines that the uplink SRS resource #1-1 has a larger number of RBs that overlap the downlink RBG #1-5.

As a result, the control unit 140 of the eNB 100-1 assigns the downlink RBG #1-5 to the UE 200-1 that transmitted the SRS (specific SRS) by using the uplink SRS resource #1-1.

Further, the weight calculation unit 120 of the eNB 100-1 calculates the antenna weight on the basis of the SRS transmitted by using the uplink SRS resource #1-1, for the RB #12 and the RB #13 (first portion) that overlap in frequency band with the uplink SRS resource #1-1, of the downlink RBG #1-5, and does not calculate the antenna weight for the RB #14 (second portion) that does not overlap in frequency band with the uplink SRS resource #1-1.

The weight multiplication unit 125 of the eNB 100-1 applies the antenna weight calculated by the weight calculation unit 120 to the RB #12 and the RB #13 (first portion) that overlap in frequency band with the uplink SRS resource #1-1, of the downlink RBG #1-5, and copies the antenna weight calculated by the weight calculation unit 120 and the copied antenna weight applies to the RB #14 (second portion) that does not overlap in frequency band with the uplink SRS resource #1-1.

The radio transmission unit 130 of the eNB 100-1 transmits the transmission signal thus weighted to the UE 200-1 by using the PDSCH resource including the downlink RBG #1-5. It is noted that the assignment information of the downlink RBG is notified by using the PDSCH resource (not shown) within the same subframe as the PDSCH resource, according to the specification.

Also in a DL timing in another SRS cycle, the downlink RBG assignment and the antenna weight calculation are performed according to the above-described procedure.

However, when there is no SRS (uplink SRS resource) that overlaps, in frequency band, with the subject downlink RBG, out of a plurality of SRSs received recently before the subject downlink RBG, the downlink RBG assignment and the antenna weight calculation are performed according to a procedure, below.

As one example, a description will be given of an operation of a case where in the DL of the SRS cycle #3, a downlink RBG #3-1 including RB #0 to RB #2 is the subject downlink RBG. The downlink RBG #3-1 has no uplink SRS resource that overlaps in frequency band, in a recent SRS timing (SRS timing within the same SRS frequency as the downlink timing).

In this case, the control unit 140 of the eNB 100-1 specifies the uplink SRS resource #2-1 that overlaps, in frequency band, with the downlink RBG #3-1 in the past SRS timing (SRS timing of one previous SRS cycle #2). It is noted that an assignment status and an SRS reception status in a past certain period are to be stored in the storage unit 150. Further, the antenna weight in a past certain period also is to be stored in the storage unit 150. As a result, the control unit 140 of the eNB 100-1 assigns the downlink RBG #3-1 to the UE 200-6 that transmitted the SRS (specific SRS) by using the uplink SRS resource #2-1.

Then, the control unit 140 of the eNB 100-1 acquires the antenna weight calculated on the basis of the SRS of the uplink SRS resource #2-1 from the storage unit 150, and outputs the acquired antenna weight to the weight multiplication unit 125. The weight multiplication unit 125 applies the antenna weight from the control unit 140, to the downlink RBG #3-1. The radio transmission unit 130 of the eNB 100-1 transmits the transmission signal thus weighted to the UE 200-6 by using the PDSCH resource including the downlink RBG #3-1. It is noted that the assignment information of the downlink RBG is notified by using the PDSCH resource (not shown) within the same subframe as the PDSCH resource, according to the specification.

(3) Flow of Downlink RBG Assignment and Antenna Weight Calculation

Next, by using FIG. 6, a flow of the downlink RBG assignment and the antenna weight calculation by the eNB 100-1 according to the present embodiment, will be described. The present flow is implemented for each subject downlink RBG.

Figure 6:
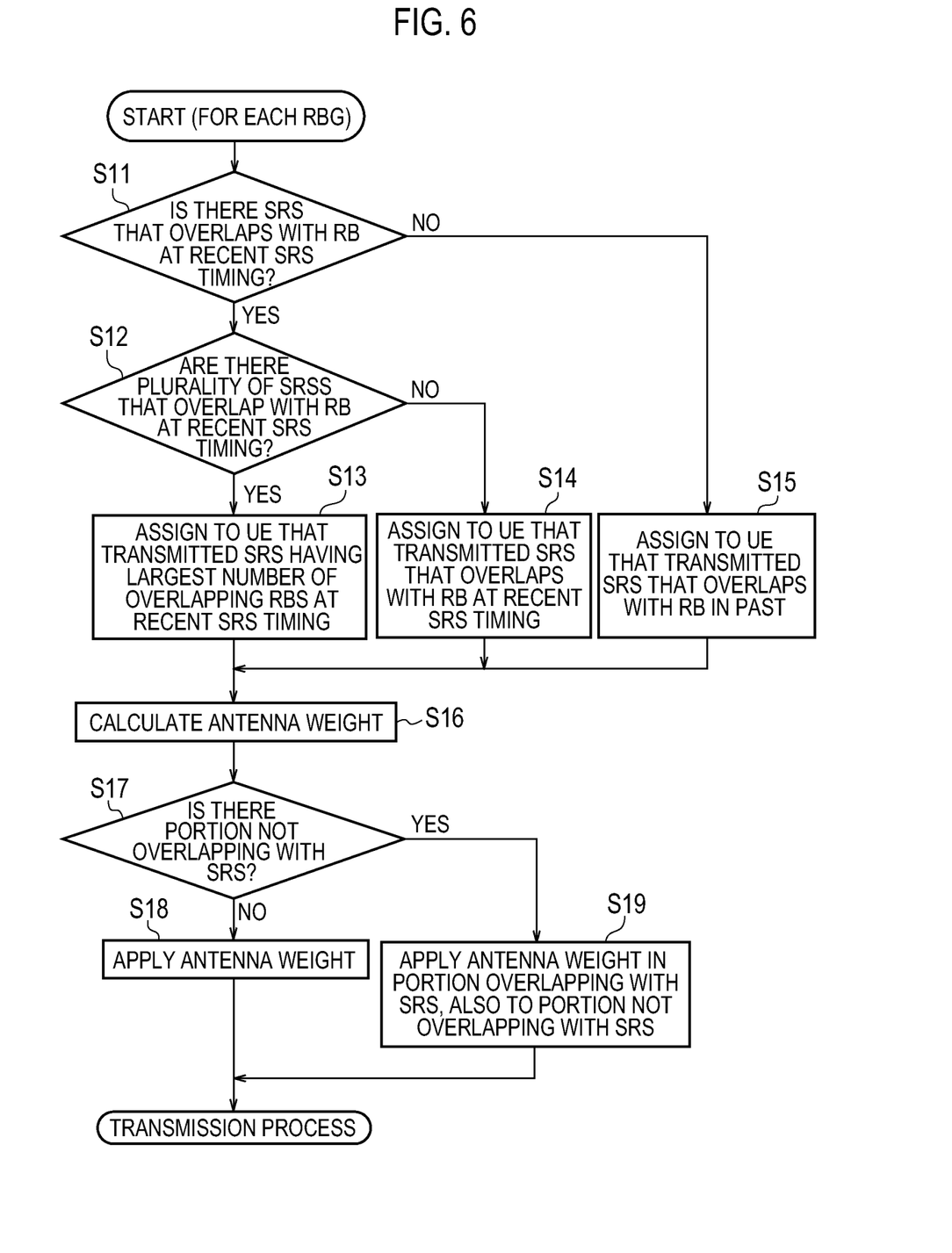
FIG. 6 is a flow diagram of the downlink RBG assignment and the antenna weight calculation by the eNB according to an embodiment of the present invention.

As shown in FIG. 6, instep S11, the control unit 140 determines whether or not there exists an uplink SRS resource that overlaps, in frequency band, with the subject downlink RBG at the SRS timing within the same SRS cycle as the subject downlink RBG, that is, whether or not the SRS that overlaps, in frequency band, with the subject downlink RBG has been received.

When the SRS that overlaps, in frequency band, with a subject downlink RBG has not been received at the SRS timing within the same SRS cycle as the subject downlink RBG (step S11; No), in step S15, the control unit 140 designates the uplink SRS resource (SRS) that overlaps, in frequency band, with the subject downlink RBG at the past SRS timing (SRS timing within one or more previous SRS cycles), and assigns the subject downlink RBG to the UE 200 that transmitted the SRS.

On the other hand, when the SRS that overlaps, in frequency band, with a subject downlink RBG has been received at the SRS timing within the same SRS cycle as the subject downlink RBG (step S11; Yes), in step S12, the control unit 140 determines whether or not a plurality of SRSs that overlap in frequency band with the subject downlink RBG are received at the SRS timing within the same SRS cycle as the subject downlink RBG.

When only one SRS that overlaps, in frequency band, with the subject downlink RBG is received at the SRS timing within the same SRS cycle as the subject downlink RBG (step S12; No), in step S14, the control unit 140 assigns the subject downlink RBG to the UE 200 that transmitted the one SRS.

On the other hand, when a plurality of SRSs that overlap in frequency band with the subject downlink RBG are received at the SRS timing within the same SRS cycle as the subject downlink RBG (step S12; Yes), in step S13, the control unit 140 assigns the subject downlink RBG to the UE 200 that transmitted SRS having a largest number of RBs that overlap with the RB included in the subject downlink RBG.

In step S16, the weight calculation unit 120 calculates the antenna weight on the basis of the uplink SRS resource corresponding to the subject downlink RBG.

In step S17, the weight multiplication unit 125 determines whether or not the subject downlink RBG has RB that does not overlap in frequency band with the uplink SRS resource corresponding to the subject downlink RBG.

When the subject downlink RBG has no RB that does not overlap in frequency band with the uplink SRS resource corresponding to the subject downlink RBG (step S17; No), the weight multiplication unit 125 performs a weighting process by multiplying the downlink data that should be transmitted by using the subject downlink RBG by the antenna weight calculated by the weight calculation unit 120.

On the other hand, when the subject downlink RBG has RB that does not overlap in frequency band with the uplink SRS resource corresponding to the subject downlink RBG (step S17; Yes), the weight multiplication unit 125 applies the antenna weight calculated by the weight calculation unit 120 to the RB that overlaps, in frequency band, with the uplink SRS resource corresponding to the subject downlink RBG, of the downlink RBG, and copies the antenna weight calculated by the weight calculation unit 120 and applies the copied antenna weight to the RB that does not overlap in frequency band with the subject uplink SRS resource.

(Summary of the Embodiment)

As described above, in the TD-LTE system 10, the eNB 100-1 that performs radio communication by using the adaptive array control includes: the radio reception unit 110 that receives the SRS utilized in the adaptive array control from a plurality of UEs 200; and the control unit 140 that performs an assignment for each subject downlink RBG, out of a plurality of downlink RBGs. The control unit 140 assigns the subject downlink RBG to UE 200 that transmitted a specific SRS that is SRS having the highest match rate in a frequency band with the subject downlink RBG, out of a plurality of SRSs received recently before the subject downlink RBG.

Thus, even when a bandwidth of one uplink SRS resource and a bandwidth of one downlink RBG differ, it is possible to maintain the symmetry between the uplink SRS resource and the downlink RBG, and thus, it is possible to enable the adaptive array control to be favorably functioned. In particular, when the frequency band of the SRS and the frequency band of the PDSCH are approximated, that is, when the frequency band for calculating the antenna weight and the frequency band to which the antenna weight is applied are approximated, it becomes possible to enable beamforming and null steering to be favorably functioned.

In the present embodiment, the eNB 100-1 further includes: the weight calculation unit 120 that calculates the antenna weight on the basis of a specific SRS; and the weight multiplication unit 125 that applies the antenna weight to the subject downlink RBG. The weight multiplication unit 125 applies the antenna weight calculated on the basis of a specific SRS to the first portion that overlaps, in frequency band, with the specific SRS corresponding to a subject downlink RBG, of the subject downlink RBG, copies the antenna weight applied to the first portion, and applies the copied antenna weight to the second portion that does not overlaps, in frequency band, with the specific SRS, of the subject downlink RBG.

As a result, it is possible to apply an appropriate antenna weight even to a portion that does not overlap in frequency band with a specific SRS, of a subject downlink RBG, and thus, it is possible to enable adaptive array control to be favorably functioned.

(Other Embodiment)

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

In the above-described embodiment, one example is described where the uplink SRS resource is configured by four RBs and the downlink RBG is configured by three RBs; however, the uplink SRS resource may be configured by any other number of RBs and the downlink RBG may be configured by any other number of RBs.

In the above-described embodiment, the description is given of the example where the SRS is used as the uplink reference signal utilized in the adaptive array control; however, a demodulation reference signal (DMRS) may be used instead of the SRS.

Further, in the above-described embodiment, the description proceeds with the example where the present invention is applied to the TD-LTE system 10; however, the present invention may be applied to another system adopting the TDD scheme and the adaptive array control.

Note that the entire content of the Japanese Patent Application No. 2011-163735 (filed on Jul. 26, 2011) is incorporated herein by reference.

Industrial Applicability

As mentioned above, the present invention is useful in radio communication such as mobile communication, with which it is possible to enable adaptive array control to be favorably functioned even when bandwidths of an uplink reference signal resource and a downlink radio resource differ respectively in a TDD radio communication system.

The invention claimed is:

1. A radio base station that performs radio communication by using adaptive array control, in a TDD radio communication system, comprising:
   a reception unit that receives an uplink reference signal utilized in the adaptive array control from a plurality of radio terminals; and
   a resource assignment unit that performs an assignment for each subject downlink radio resource, of the plurality of downlink radio resources, wherein
   the resource assignment unit assigns the subject downlink radio resource to a radio terminal that has transmitted a specific uplink reference signal that is an uplink reference signal having the largest number of specific resource blocks that overlap with a specific set of resource blocks included in the subject downlink radio resource, of a plurality of uplink reference signals received recently before the subject downlink radio resource.

2. The radio base station according to claim 1, further comprising:
   a weight calculation unit that calculates an antenna weight on the basis of the specific uplink reference signal; and
   a weight multiplication unit that applies the antenna weight to the subject downlink radio resource, wherein
   the weight multiplication unit
   applies the antenna weight calculated on the basis of the specific uplink reference signal to a first portion of the subject downlink radio resource, the first portion overlapping in frequency band with the specific uplink reference signal, and
   copies the antenna weight applied to the first portion and applies the copied antenna weight to a second portion of the subject downlink radio resource, the second portion not overlapping in frequency band with the specific uplink reference signal.

3. The radio base station according to claim 1, wherein a bandwidth of the downlink radio resource differs from a bandwidth of the uplink reference signal.

4. The radio base station according to claim 1, wherein
   the downlink radio resource includes the predetermined number of resource blocks,
   the uplink reference signal includes resource blocks in the number different from the predetermined number, and
   the specific uplink reference signal is an uplink reference signal having the largest number of resource blocks that overlap the resource block included in the subject downlink radio resource, of the plurality of uplink reference signals received recently before the subject downlink radio resource.

5. A communication control method in a radio base station that performs radio communication by using adaptive array control in a TDD radio communication system, comprising:
   a step of receiving an uplink reference signal utilized in the adaptive array control from a plurality of radio terminals; and
   a resource assignment step of performing an assignment for each subject downlink radio resource, of the plurality of downlink radio resources, wherein
   in the resource assignment step, the radio base station assigns the subject downlink radio resource to a radio terminal that has transmitted a specific uplink reference signal that is an uplink reference signal having the largest number of specific resource blocks that overlap with a specific set of resource blocks included in the subject downlink radio resource, of a plurality of uplink reference signals received recently before the subject downlink radio resource, and
   a frequency band used for the specific uplink reference signal more overlaps with a frequency band used for the subject downlink radio resource than a frequency band used for any other uplink reference signal of the plurality of uplink reference signals.

* * * * *